(12) United States Patent
Bahlke (10) Patent No.: US 10,350,846 B2
(45) Date of Patent: Jul. 16, 2019

(54) BLOCKING THE VERTICAL POSITION OF A TREATMENT CHAMBER

(71) Applicant: HARBURG-FREUDENBERGER MASCHINENBAU GMBH, Hamburg (DE)

(72) Inventor: Stefan Bahlke, Hamburg (DE)

(73) Assignee: HARBURG-FREUDENBERGER MASCHINENBAU GMBH, Hamburg (DE)

( * ) Notice: Subject to any disclaimer, the term of this patent is extended or adjusted under 35 U.S.C. 154(b) by 0 days.

(21) Appl. No.: 15/577,483

(22) PCT Filed: May 25, 2016

(86) PCT No.: PCT/DE2016/000224
§ 371 (c)(1),
(2) Date: Nov. 28, 2017

(87) PCT Pub. No.: WO2016/188510
PCT Pub. Date: Dec. 1, 2016

(65) Prior Publication Data
US 2018/0147801 A1   May 31, 2018

(30) Foreign Application Priority Data
May 28, 2015 (DE) .................. 10 2015 007 201

(51) Int. Cl.
*B29D 30/06* (2006.01)

(52) U.S. Cl.
CPC ......... *B29D 30/0662* (2013.01); *B29D 30/06* (2013.01); *B29D 30/0601* (2013.01); *B29D 30/0603* (2013.01); *B29D 30/0606* (2013.01)

(58) Field of Classification Search
CPC ...................... B29D 30/0606; B29D 30/0662; B29C 33/22; B29C 33/24
See application file for complete search history.

(56) References Cited

U.S. PATENT DOCUMENTS

| 1,871,160 | A | * | 8/1932 | Denmire | ............ B29D 30/0606 425/47 |
| 2,198,493 | A | * | 4/1940 | Freeman | ............ B29D 30/0601 425/40 |
| 2,279,540 | A | * | 4/1942 | Voth | .................... B29D 30/0601 425/36 |
| 3,550,196 | A | | 12/1970 | Gazuit | |
| 3,669,581 | A | * | 6/1972 | Maurer et al. | ..... B29D 30/0601 425/34.3 |

(Continued)

FOREIGN PATENT DOCUMENTS

FR        2627723 A1   9/1989
FR        2966075 A1   4/2012

*Primary Examiner* — James P Mackey
(74) *Attorney, Agent, or Firm* — Lucas & Mercanti, LLP; Klaus P. Stoffel (57) ABSTRACT

A vertical position fixing of a treatment chamber inside a tire vulcanizing machine for the fastening of treatment chamber elements at least during a vulcanization process so that in the closed position at least one defined vertical distance H can be fixed, wherein fixing elements are provided on at least one treatment chamber element and are designed in such a way that a fixing which is releasable and absorbs the occurring forces is facilitated.

13 Claims, 7 Drawing Sheets

(56) References Cited

U.S. PATENT DOCUMENTS

| | | | | |
|---|---|---|---|---|
| 3,918,861 | A | * | 11/1975 | Klose .................... B29C 33/202 425/34.1 |
| 3,936,251 | A | * | 2/1976 | Billey ................ B29D 30/0603 425/38 |
| 4,025,251 | A | * | 5/1977 | Cantarutti .......... B29D 30/0603 425/31 |
| 4,383,808 | A | * | 5/1983 | Kubo .................... B29C 33/202 425/32 |
| 4,390,334 | A | * | 6/1983 | Singh ................ B29D 30/0649 425/28.1 |
| 4,453,902 | A | * | 6/1984 | Imbert ............... B29D 30/0601 425/28.1 |
| 4,563,139 | A | * | 1/1986 | Yokoyama ......... B29D 30/0605 425/32 |
| 4,813,861 | A | * | 3/1989 | Hasegawa ............ B29C 33/202 425/28.1 |
| 4,927,344 | A | | 5/1990 | Amano et al. |
| 8,282,373 | B2 | * | 10/2012 | Fujieda .............. B29D 30/0601 425/47 |
| 9,346,228 | B2 | * | 5/2016 | Singh ................ B29D 30/0605 |
| 9,446,561 | B2 | * | 9/2016 | Singh ................ B29D 30/0601 |
| 2014/0147539 | A1 | | 5/2014 | Jeannoutot et al. |
| 2015/0079210 | A1 | | 3/2015 | Singh et al. |

\* cited by examiner

BLOCKING THE VERTICAL POSITION OF A TREATMENT CHAMBER

The present application is a 371 of International application PCT/DE2016/000224, filed May 25, 2016, which claims priority of DE 10 2015 007 201.3, filed May 28, 2015, the priority of these applications is hereby claimed and these applications are incorporated herein by reference.

BACKGROUND OF THE INVENTION

The invention relates to a vertical position fixing of a treatment chamber inside a tire vulcanizing machine for the fastening of treatment chamber elements at least during a vulcanization process so that in the closed position at least one defined vertical distance H can be fixed, wherein fixing means are provided on at least one treatment chamber element and designed in such a way that a fixing which is releasable and absorbs the occurring forces is facilitated.

The production of a tire, for example for vehicles such as automobiles or motorcycles, is an extremely costly process, consisting of a large number of production and process steps. The cause for this is the complicated tire construction which consists of a considerable number of different individual components. Added to this is the fact that this large number of components, under the effect of pressure and temperature of the so-called vulcanization, have to be interlinked. The vulcanizing process is also significant with regard to the material properties and adhesion properties of the finished tire.

For this reason, one of the essential production steps for producing tires is the vulcanizing of tire blanks culminating in a finished tire. To this end, the tire blank is inserted into a mold or tire mold which is located inside a tire vulcanizing machine and then heated to the material-dependent vulcanizing temperature and then subjected to the application of a vulcanizing pressure inside the tire blank. In order to reach the vulcanizing temperature and the vulcanizing pressure, a suitable heating medium at a corresponding temperature and under the application of pressure is introduced into the interior space of the tire blank.

The vulcanization basically has the aim of practically "finish baking" a tire blank by means of temperature and pressure application within one or more time intervals, that is to say to interlink the components of the tire blank and to impress elastic properties into the base materials and the India rubber/natural rubber layer by crosslinking processes. To this end, in addition to the actual pressure and temperature application different additive substances, matched to the base material, are furthermore required for the crosslinking and, if necessary, for the crosslinking acceleration.

For carrying out a vulcanization of the elastomer material, an appreciable amount of thermal energy has to be introduced into the material. To this end, it is largely insufficient to subject the tire blank to be vulcanized to the application of a vulcanizing temperature and a vulcanizing pressure on the inner side.

In order to achieve the amount of thermal energy and pressure application which are necessary for the vulcanization process, a pressure and/or temperature action upon the tire blank is alternatively or additionally provided on the outer side of the tire blank in the vulcanizing machine. To this end, a treatment chamber, which encompasses a tire mold and can be opened or closed, is usually installed so that the tire blank to be vulcanized can be inserted, vulcanized and removed.

Particularly thick regions of the tire blank are the treads. The sidewalls are of relatively thin design. The reason for this noticeable thickness difference are the additional tire components which are arranged in the region of the tread, such as steel breakers, breaker cover ply and the considerably thicker India rubber/natural rubber layer in comparison to the sidewall. This considerably thicker India rubber/natural rubber layer has a greater wall thickness not least because it encompasses the actual tire profile which is produced during the vulcanizing process. To this end, the tread region or the thick-walled India rubber/natural rubber mass provided there has to be heated until it can flow plastically and can be pressed by the vulcanization pressure into the profile-negative die of the tire blank mold of the tire vulcanizing machine. The plastic flowability increases with increased heating of the material within a wide range so that less pressing pressure is required in order to be able to reliably produce the profiling.

On account of the necessary vulcanizing temperatures of up to 200 degrees Celsius, frequently in the region of about 160 degrees Celsius, an appreciable temperature gradient exists inside the treatment chamber or the tire mold between the machine interior and the environment of the tire vulcanizing machine which usually has room temperature. This situation, in addition to the basic requirement of the machine operation, taking into account the most energy-efficient conservation of resources, is responsible for heat losses having to be reduced, especially as a result of convection over the surface of the treatment chamber of the tire vulcanizing machine.

Many tire vulcanizing machines are constructed in such a way that the treatment chamber is a functional core element. The treatment chamber serves either directly for accommodating the tire blank to be vulcanized or a tire mold or a so-called container and is delimited in its spatial extent by means of a bottom plate with mold pressure plate and a mold counter-pressure plate and also a preferably cylindrical tension casing. All the chamber delimiting components of the treatment chamber participate in the heat losses chiefly as a result of convection. The tension casing in particular with its considerably large surface causes large heat losses in this case.

Not only the convection-inducted heat losses have direct influence upon the energy balance of the tire vulcanizing machine. The size and especially the spatial volume of the treatment chamber is also a not inconsiderable factor in this respect. In the ideal case, the treatment chamber is dimensioned in such a way that the tire blank to be vulcanized in each case with or without an optionally encasing container or a tire mold can be accommodated. In this case, attention has to be paid to the fact that the treatment chamber has to be able to be opened and closed. Also, a handling space has to be facilitated, at least in the open position, in order to ensure the handling of the tire blanks or finished tires during unloading and loading of the treatment chamber.

In order to be able to carry out the tire vulcanization in an energetically favorable and functionally practical manner, especially in the case of alternately differently dimensioned tires, it is necessary that at least the height of the treatment chamber and/or its clear width can be influenced and adapted by means of suitable measures.

A further requirement criterion for the treatment chamber is the internal and/or external pressure application of the tire blank to be vulcanized. In order to achieve the amount of thermal energy and pressure application required for the vulcanization process, a pressure and/or temperature action upon the tire blank is alternatively or additionally provided on the outer side of the tire blank in the vulcanizing machine. To this end, a treatment chamber, which is referred to as a tire mold and can be opened or closed, is usually installed so that the tire blank to be vulcanized can be inserted, vulcanized and removed.

Following the general physical principle of the pressure propagation on all sides, the treatment chamber and/or the handling chamber or the tire mold has to support and absorb the pressing and pressure forces both in the radial and the axial direction. As a consequence of this, the movement devices for opening and closing the tire mold, regardless of whether the tire mold is arranged longitudinally or transversely to the rotational axis of the tire to be vulcanized, usually have to apply not only the forces for movement of at least one mold half but these also have to sufficiently dimensioned with regard to the closing forces during the tire vulcanization. On account of the closing forces which reach up to several kN, high-pressure fluid cylinders are used in most cases in addition to mechanical solutions such as toggle lever constructions or spindles.

Devices of this type certainly integrate both the movement function and the closing force function, but are axially very high in their construction and, depending on embodiment, are sensitive to radial forces and high temperatures or temperature gradients.

One approach for overcoming this complexity of problems can exist in separating the closing force function from the movement function in a device engineering manner. In the case of such a function separation, a locking function has to optionally be provided in addition, which locking function, under specified preconditions, can also be implemented within the movement device.

In order to create a suitable and advantageous closing force unit for the closing force function which is to be realized, isolated from the movement function, it is proposed to constructionally integrate into the tire vulcanizing machine especially linear drives, based on the plunger cylinder principle. To this end, at least one fluid cylinder is constructed as an integrative component part of the tire vulcanizing mold and/or of the machine components.

It is intended to introduce the fluid cylinder, which consists of a piston and possibly a piston rod and also a cylinder housing, not as a separate bought-in part but to build a fluid linear drive into the bottom plate or baseplate of the tire vulcanizing machine in an integrative manner.

The integrative style of construction can be implemented by the direct utilization of the bottom plate as a cylinder housing. To this end, holes are introduced into the bottom plate corresponding to the required number of fluid linear drives and which, depending on the embodiment of the fluid linear drive, can be constructed as a through-hole and/or as a blind hole. In this way, both piston-piston rod-linear drives and also piston-linear drives based on the plunger cylinder principle can be integrated.

If such a closing force unit is used for providing the closing force function, a movement device which implements the movement function has to be added in order to bring about the opening and closing of the tire mold or of the treatment chamber and therefore of the cavity of the tire vulcanizing machine.

Movement devices for providing the movement function can be constructed in an integrative or separate manner by means of a device, with a linear drive and a linear guide unit, which is decoupled from the closing force unit. Multifarious possibilities, such as fluid cylinders, electric linear drives, spindles and ball screw spindles or guides of a large variety of types lend themselves for this.

In the context of the function separation of closing force function and movement function, in many cases a further function object has to be achieved: The vertical position fixing of at least one of the treatment chamber-forming elements.

This fastening has to be carried out against the closing force and/or the pressure forces which result due to the treatment chamber internal pressure since in most cases the movement devices cannot, or cannot economically, be designed for this.

SUMMARY OF THE INVENTION

It is an object of the invention to provide a vertical position fixing of at least one of the treatment chamber-forming elements, which at least partially realizes the stated function and facilitates a cost-efficient overall construction.

For achieving this, the teaching according to the invention proposes a tension casing with implemented fixing means which interact with an at least frictionally engaging element of the closing force unit.

A tension casing which is suitable for this purpose is a preferably cylindrical component which at least partially geometrically delimits the treatment chamber and provides sufficiently high mechanical strength, resistance to occurring temperature gradients, and structural integrity.

The invention provides that the fixing means are a constructionally-integral component part of the treatment chamber and especially of the tension casing as at least one element of this treatment chamber.

The fixing means are constructionally realized by means of a mechanism similar to the bayonet principle. To this end, provision is made in a treatment chamber-delimiting component for at least one projection which for example has the form of a nose-like or pin-like protrusion and interacts with at least one corresponding longitudinal and transverse groove combination in the tension casing. The at least one longitudinal groove serves for promoting a degree of freedom for the displacement of the vertical position during functional engagement of the at least one projection in the groove combination, The transverse groove portion of the at least one groove combination achieves the vertical position fixing during engagement of the projection.

In order to be able to absorb at least temporarily high tensile forces in the tension casing of the treatment chamber which prevail during the tire vulcanization and also the generally appreciable force and pressure loads without structure loss and within the course of an extremely large number of stress cycles, the fixing means are sufficiently dimensioned toward fatigue strength.

In a particularly advantageous embodiment of the invention it is intended to provide at least two fixing means consisting in each case of at least one combination of projection with longitudinal and transverse groove combination. In this way, undesirable bending stresses in the components can be reduced. Furthermore, this fixing which comprises at least two points is statically defined so that a more uniform load distribution during the closed position of the treatment chamber is achieved.

In a further advantageous embodiment of the invention it is provided to arrange the at least one longitudinal and transverse groove combination, functionally corresponding with the at least one projection, on the inner side in the tension casing. In this embodiment variant, the at least one corresponding projection is designed in a radially outwardly extending manner. The arrangement of fixing means on the inner side of the tension casing promotes a space-saving and compact overall construction. Furthermore, the stress characteristic inside the components is evened out by the minimizing of force line deflections on the one hand and by the avoidance of bending stresses on the other hand.

In order to be able to absorb the occurring forces optimally in a supporting manner, it is provided in an embodiment variant that the at least one projection is located on the bottom plate of the tire vulcanizing machine. The bottom plate as an abutment with regard to technical function for the mold pressure plate and therefore as an absorbing element of the force action of the closing force unit ensures in this way that the closing forces, pressure forces and pressing forces upon the region of the treatment chamber can be restricted or limited. As a consequence of this, the movement units and/or the supporting elements of the tire vulcanizing machine can be dimensioned solely toward their respective function. As a result, a cost reducing type of construction is facilitated and a larger freer handling space is created.

A further inventive idea relates to the adjustability of the vertical position fixing. The fixing in various vertical positions facilitates in a simple and quick manner the vulcanization of tires of different dimensions and enables the uncomplicated batch change of the tire production plant. For the adjustability of the vertical position fixing, it can be provided that the longitudinal and transverse groove combination is designed in a suitable manner. To this end, at least two transverse grooves can be allocated to the at least one longitudinal groove and be designed in such a way that the at least one projection can selectively enter and engage in the first or the second transverse groove. The at least two transverse grooves are arranged in different vertical positions in the axial extent of the tension casing so that at least two vertical positions of the tension casing which differ from each other can be fixed.

BRIEF DESCRIPTION OF THE DRAWING

An exemplary embodiment of the vertical position fixing according to the invention for a tension casing of the treatment chamber of a tire vulcanizing machine is shown in the figures. In the drawing.

DETAILED DESCRIPTION OF THE INVENTION

Figure 1:
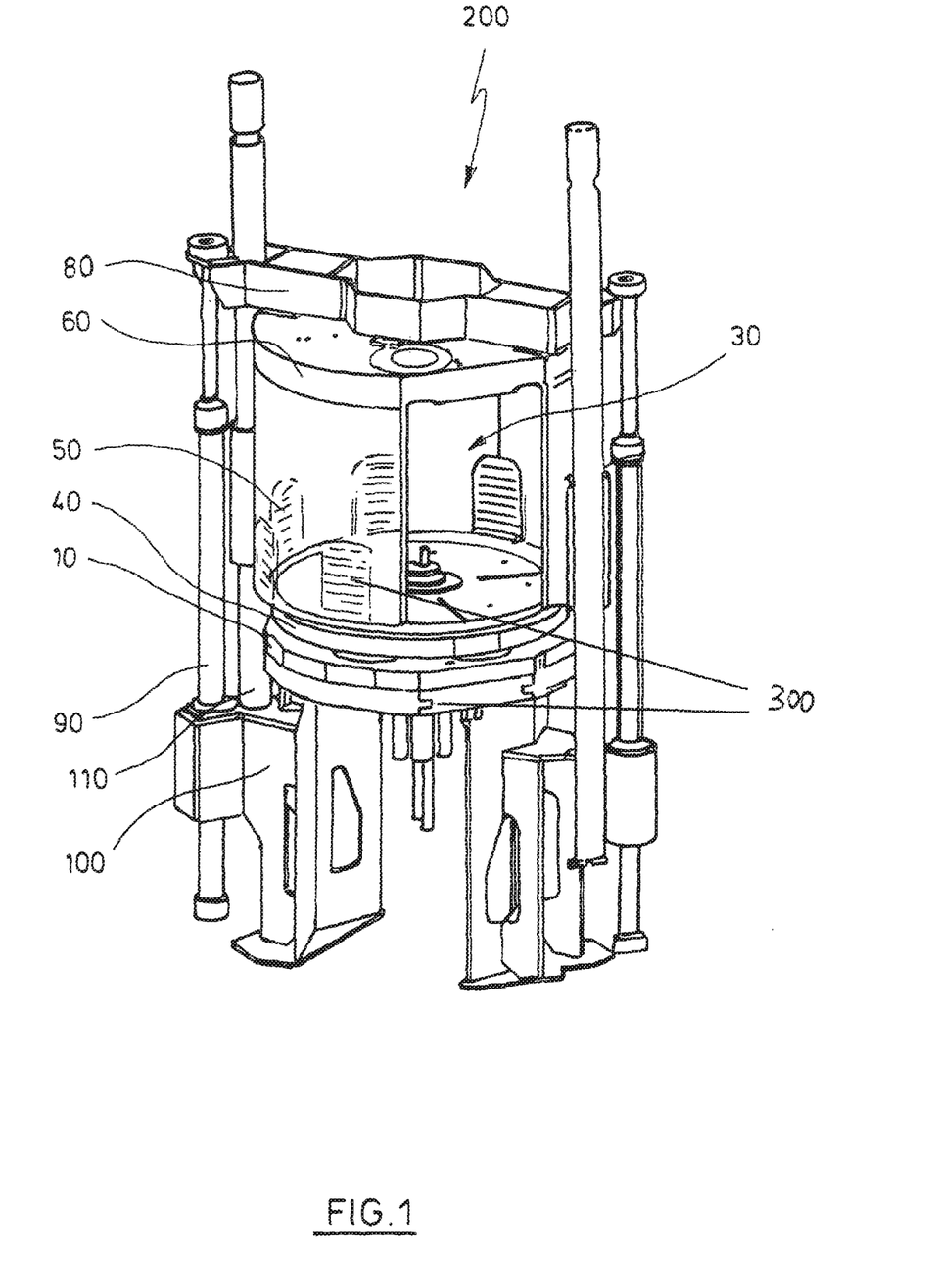
FIG. 1: shows an exemplary embodiment of the fixing means (300) according to the invention for the vertical position fixing of a tension casing (50) of the treatment chamber (30) of a tire vulcanizing machine (200) in a perspective overall view with a partial section in the x-z plane

FIG. 1 shows an exemplary embodiment of the fixing means (300) according to the invention for the vertical position fixing of a tension casing (50) of the treatment chamber (30) of a tire vulcanizing machine (200) in a perspective overall view with a partial section in the x-z plane.

The tire vulcanizing machine or tire heating press (200) is constructed in this example as a column press and in its supporting overall construction has a machine bed (100) with columns (110), a cross member (80) and a bottom plate (10).

If the tire heating press (200) is constructed for example as a frame press or pedestal press, instead of the columns use is made of frames or pedestals which are frequently an integrative part of the machine bed and undertake mounting and guiding tasks. In all the embodiments of the tire heating press (200) a treatment chamber (30) can be provided.

The functional core element of the tire vulcanizing machine (200) is the treatment chamber (30), the spatial extent of which is delimited by the mold pressure plate (40) or the bottom plate (10) and the mold counterpressure plate (60) and also by a preferably cylindrical tension casing (50). In addition to the delimiting of the vulcanizing chamber (30), two further functional tasks are allocated to the tension casing (50): As a consequence of the pressure forces inside the vulcanizing chamber (30) during the vulcanization of the tire blank the tension casing (50) absorbs the resulting (tensile) forces in the axial direction and it acts with insulating effect with regard to the vulcanizing temperatures of up to 160 degrees C., to some extent even higher, which prevail in the vulcanizing chamber (30).

The mold pressure plate (40) can be both linear-axially displaced and subjected to application of force so that a pressing force can be built up in the treatment chamber (30) and its volume adjusted. The mold counterpressure plate (60) practically constitutes the abutment for the mold pressure plate (40) for the closing and pressing forces, wherein the tension casing (50) creates the frictional engagement between the plates (10, 40, 60).

Preferably, the tension casing (50) is fastened on the mold counterpressure plate (60) and can be axially moved as a common modular unit. The mold counterpressure plate (60) together with the tension casing (50) are guided by means of two columns (110) via a cross member (80).

The movement unit is formed by an axial travel drive for the modular unit comprising mold counterpressure plate (60) with tension casing (50) and in the present example is realized by means of two fluid cylinders (90) which create a functional connection of cross member (80) to the machine bed (100) and are preferably double acting.

Figure 2:
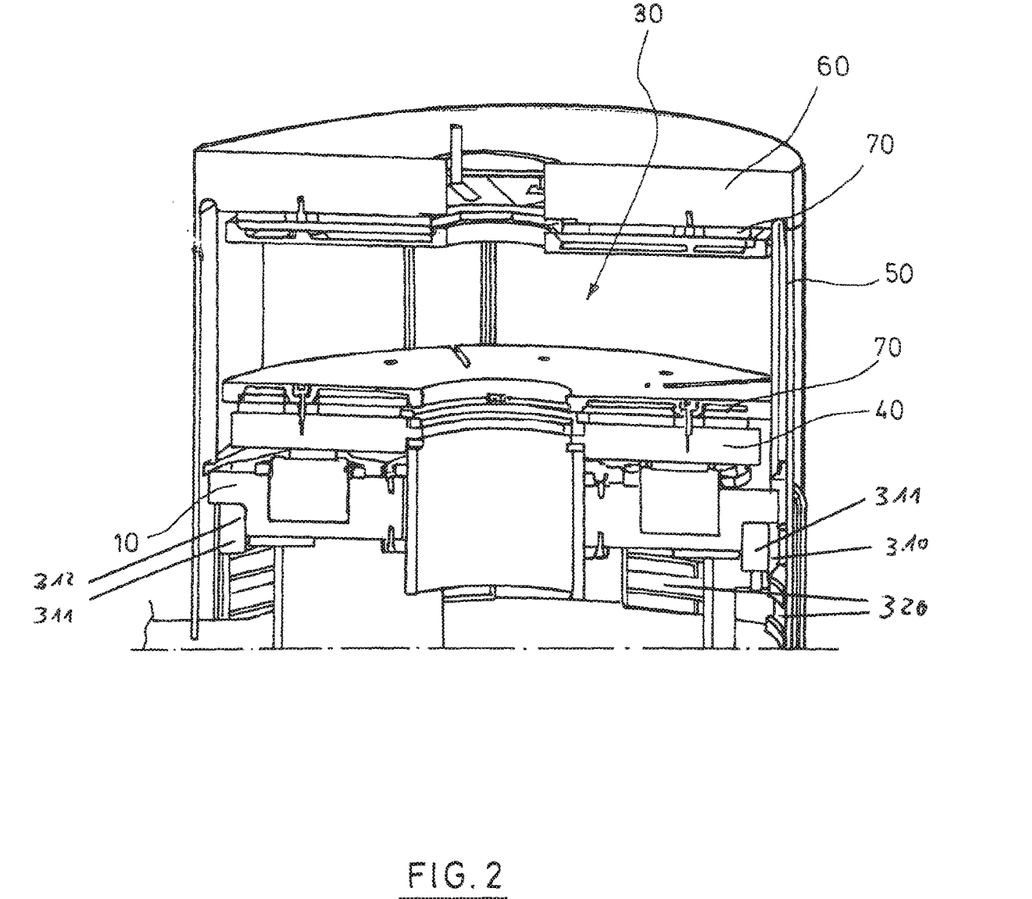
FIG. 2: shows the perspective sectional view of the treatment chamber (30) in a closed position with fixing means (300), in the form of at least one longitudinal and transverse groove combination (320) and the at least one protrusion (310), provided at least on the inner face of the tension casing (50)

FIG. 2 shows the perspective sectional view of the treatment chamber (30) in a closed position with fixing means (300), in the form of at least one longitudinal and transverse groove combination (320) and the at least one protrusion (310), provided at least on the inner face of the tension casing (50).

Essential component parts of the treatment chamber (30) are the bottom plate (10), the mold pressure plate (40), the mold counterpressure plate (60) and the tension casing (50). Optional adapter plates (70) can be provided for the fastening of tire mold halves on the mold pressure plate (40) and/or on the mold counterpressure plate (60).

Positioned adjoining the treatment chamber (30) and closing this off on an end face, from a thermal point of view, is the bottom plate (10) as a supporting base for further modular units for the treatment and vulcanizing of tire blanks. The example shown in FIG. 2 realizes the adjoining positioning of the bottom plate (10) with the treatment chamber (30) by means of the vertical and concentric position beneath the mold pressure plate (40).

The at least one protrusion (310), corresponding to the at least one longitudinal and transverse groove combination (320), is fastened on a bayonet ring (311) or its integral component part. The bayonet ring (311) is preferably movably fastened with a rotational degree of freedom relative to the bottom plate (10) and via an end-face abutment shoulder (312) can absorb occurring tensile-force abutment forces of the tension casing (50) when the fixing means (300) are in engagement in the locking position.

From the functional interaction of the corresponding fixing means (300), two position states can be achieved during the engagement of the at least one protrusion (310) in the at least one longitudinal and transverse groove combination (320):

if the engagement of the protrusion is in the region of the longitudinal groove, a vertical position alteration of the tension casing (50) relative to the bottom plate (10) is facilitated by means of the then existing axial degree of freedom, if the engagement of the protrusion is in the region of a transverse groove, the vertical position of the tension casing (50) relative to the bottom plate (10) is held by means of the degree of axial movement then being prevented by the positive lock—the fixing means are then located in the locking position.

The position change of the at least one protrusion (310) from a region of the longitudinal groove into the region of a transverse groove is achieved by means of a rotational movement of the bayonet ring (311) with a suitable degree of radian measure. The rotational movement can be initiated when the protrusion is positioned in alignment with a transverse groove in the circumferential direction.

Figure 3:
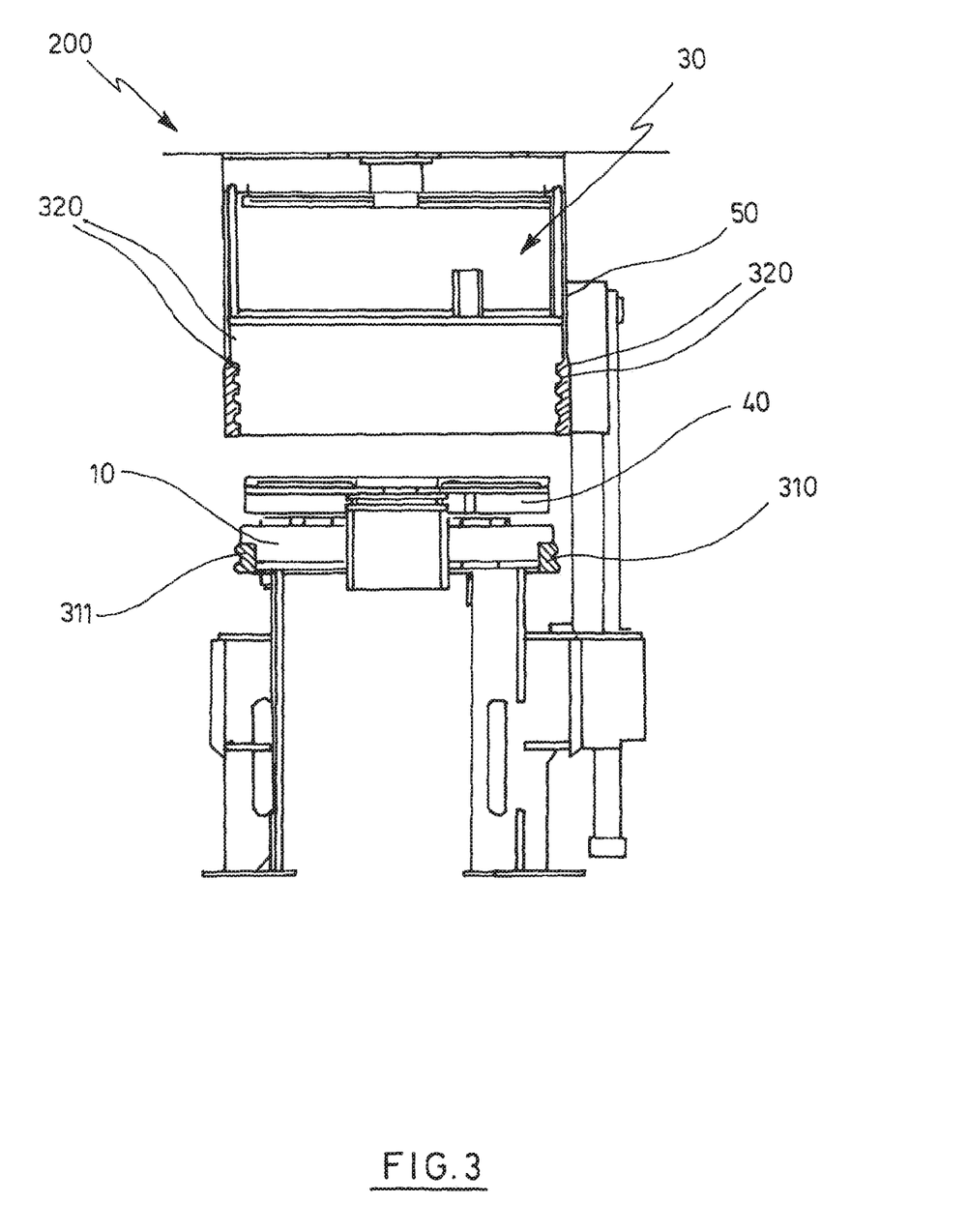
FIG. 3: shows in a side view the perspective sectional view of the treatment chamber (30) in a partially open position with fixing means (300), in the form of at least one longitudinal and transverse groove combination (320) and the at least one protrusion (310), provided at least on the inner face of the tension casing (50)

FIG. 3 shows the side view of the perspective sectional view of the treatment chamber (30) in a partially open position with fixing means (300), in the form of at least one longitudinal and transverse groove combination (320) and the at least one protrusion (310), provided at least on the inner face of the tension casing (50).

In FIG. 3, it is to be seen that this exemplary embodiment of the invention has a plurality of longitudinal and transverse groove combinations (320) which are distributed over the circumference of the tension casing (50) (symmetrically in this case) and which interact with protrusions (310) which in each case are arranged in axial alignment on the bayonet ring (311) and in a corresponding manner. With this multiple arrangement of fixing means (300, 310, 320), an appreciable local load maximum can be prevented by a statically determined load distribution being facilitated.

This exemplary embodiment furthermore shows three transverse grooves (320) in each case arranged in parallel one above the other in the axial direction and geometrically designed in such a way that a protrusion (310) can be brought into engagement. In this way, a vertical position adjustment in three fixing positions is possible.

Figure 4:
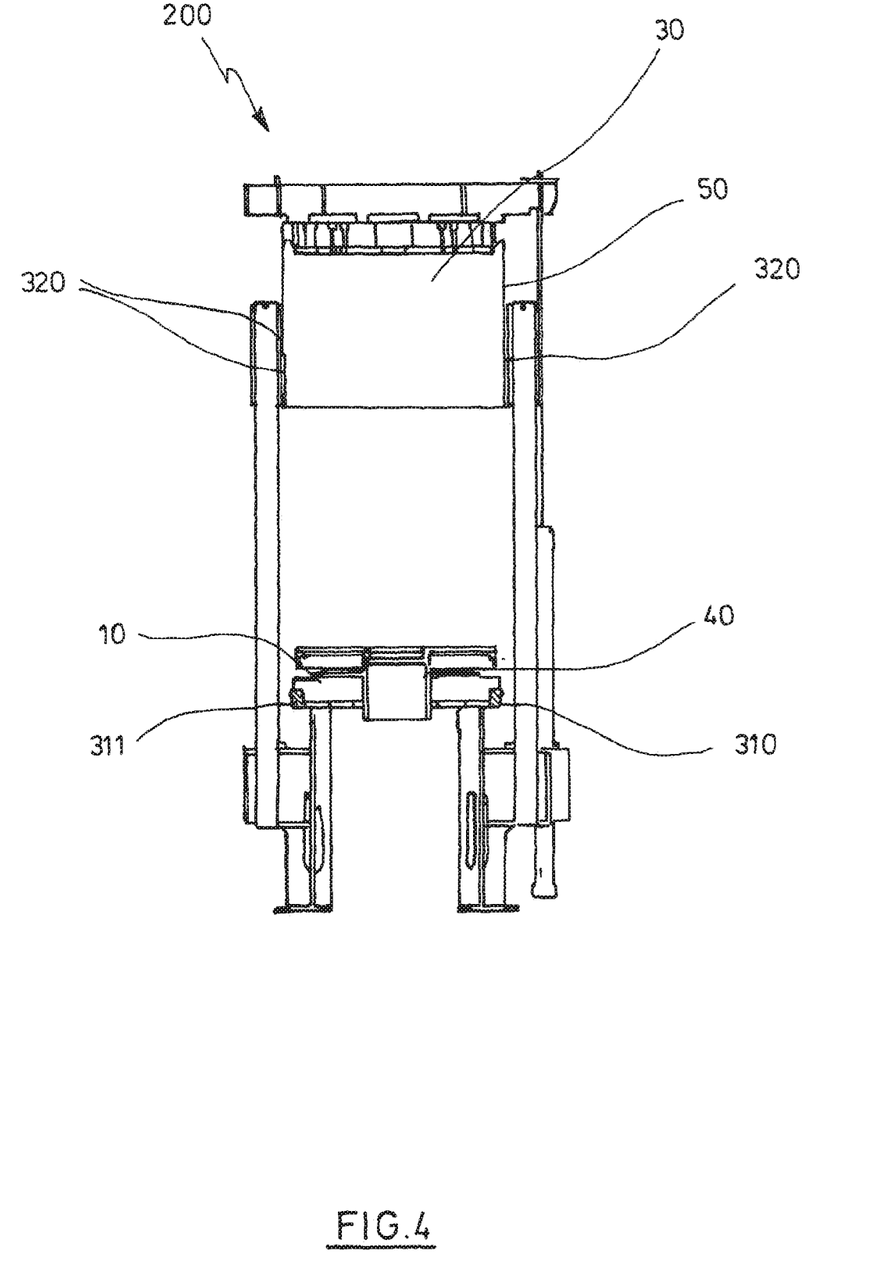
FIG. 4: shows in a side view the perspective sectional view of the treatment chamber (30) in an open position

FIG. 4 shows in a side view the perspective sectional view of the treatment chamber (30) in an open position with the maximum possible clear width between bottom plate (10) and tension casing (50). The depicted open treatment chamber (30) is a cavity in respect to press construction engineering and in the depicted open position enables the implementation of the handling function, especially the loading with tire blanks and/or the unloading of vulcanized finished tires.

Figure 5:
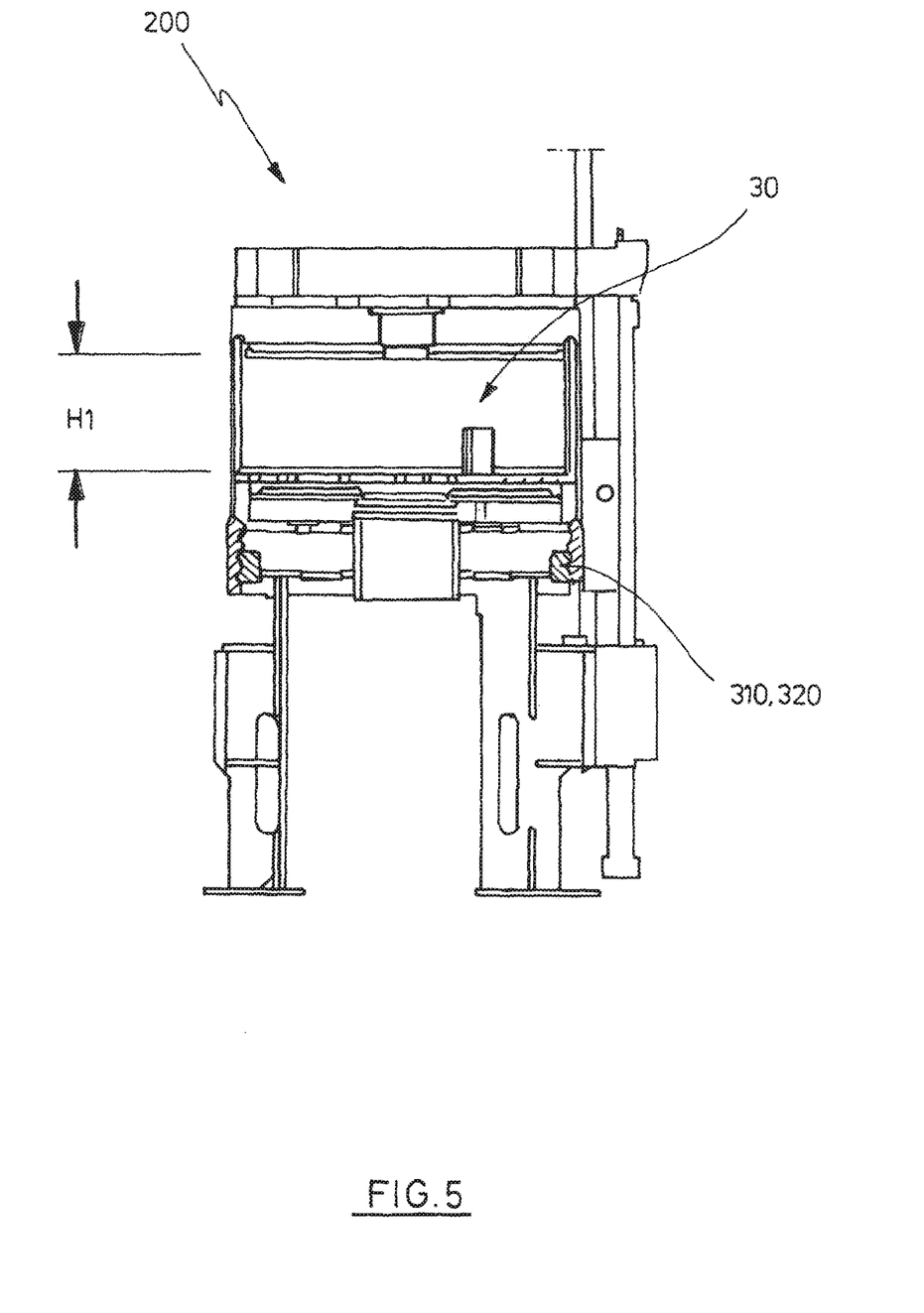
FIG. 5: shows in a side view the perspective sectional view of the treatment chamber (30) in a closed position with a first vertical position fixing of the tension casing (50) relative to the bottom plate (10)

FIG. 5 shows in a side view the perspective sectional view of the treatment chamber (30) in a closed position with a first vertical position fixing (H1) of the tension casing (50) relative to the bottom plate (10). The fixing means (310, 320) engage with each other in a positively locking manner, similar to a tongue-in-groove arrangement, so that axially directed longitudinal forces between the bottom plate (10) and the tension casing (50) can be transferred.

Figure 6:
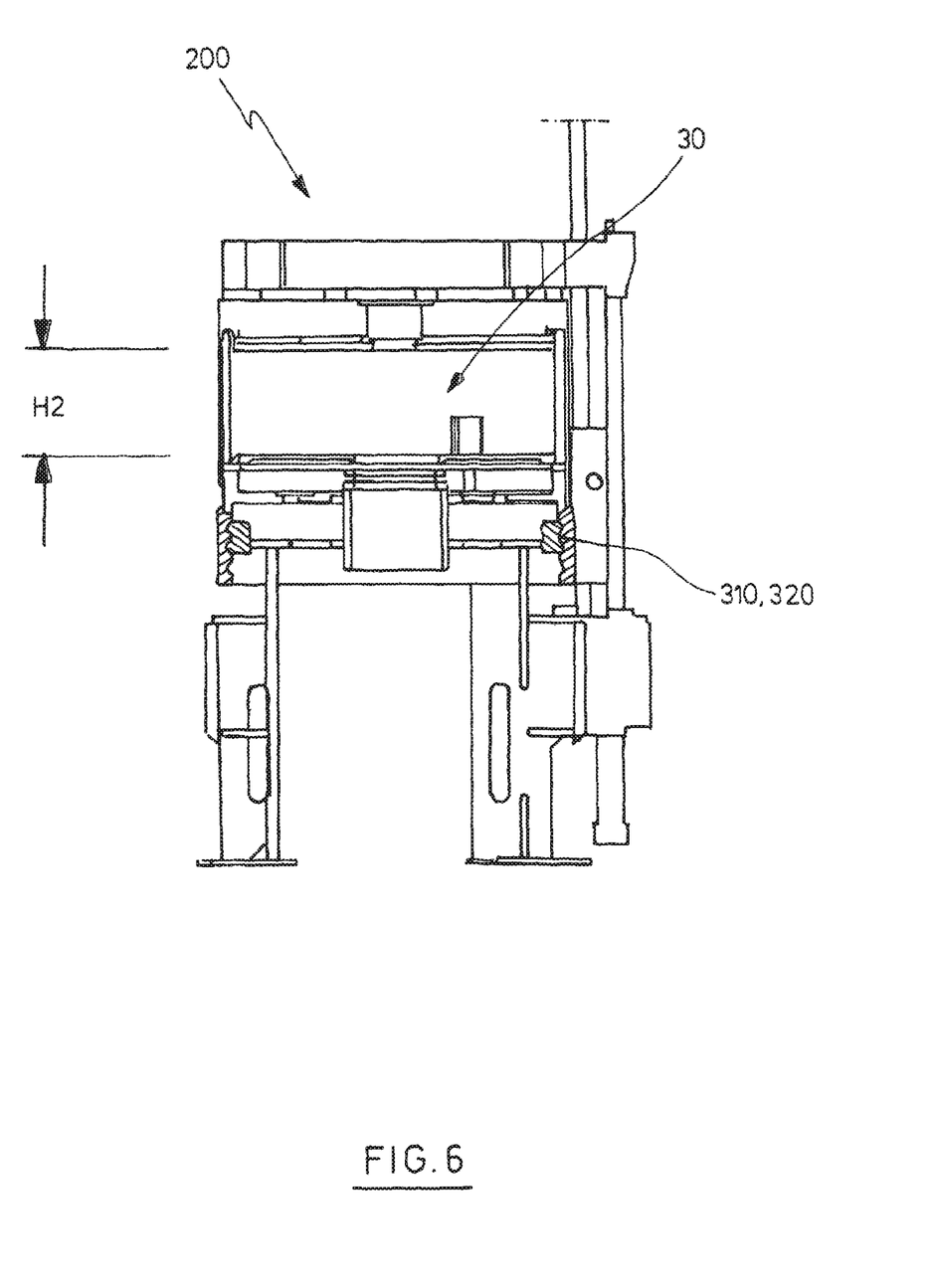
FIG. 6: shows in a side view the perspective sectional view of the treatment chamber (30) in a closed position with a second vertical position fixing of the tension casing (50) relative to the bottom plate (10)
Figure 7:
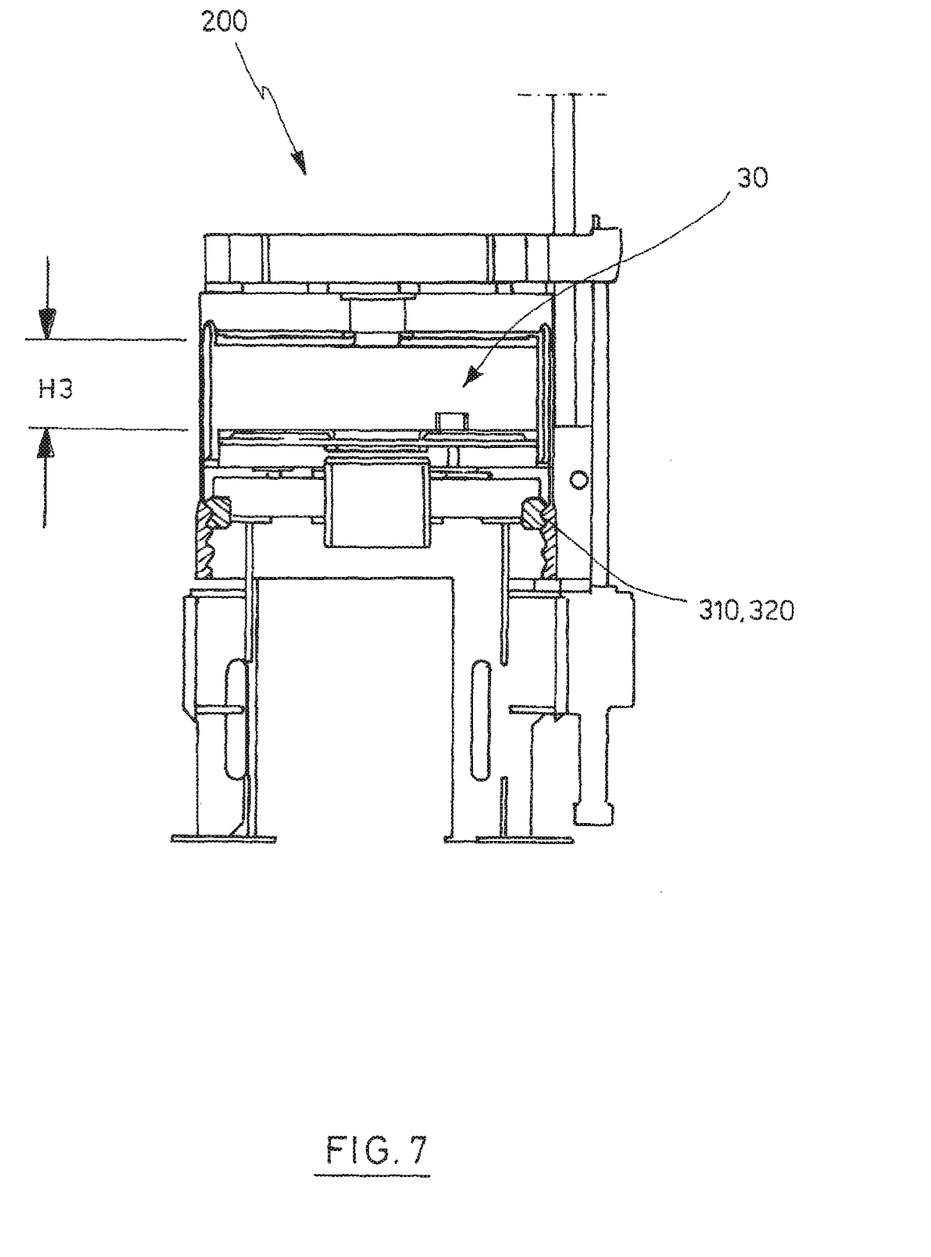
FIG. 7: shows in a side view the perspective sectional view of the treatment chamber (30) in a closed position with a third vertical position fixing of the tension casing (50) relative to the bottom plate (10).

FIGS. 6 and 7, similar to FIG. 5, show the facilitated further vertical position fixings (H2, H3) of the tension casing (50) relative to the bottom plate (10). The exemplary embodiment shown in the figures has transverse grooves which are arranged in relation to each other in such way to provide the following vertical position measurements: H1>H2>H3.

The invention claimed is:

1. A vertical position fixing assembly for a treatment chamber inside a tire vulcanizing machine for fastening treatment chamber elements at least during a vulcanization process so that in a closed position at least one defined vertical distance defining a vertical extent of the treatment chamber is fixable, the fixing assembly comprising: fixing elements provided on at least one treatment chamber element, the fixing elements being configured to provide a fixing which is releasable and absorbs occurring forces, wherein the fixing elements are provided at least in a region of a tension casing, wherein the fixing elements are provided at least in a section of an inner wall of the tension casing, wherein the fixing elements include at least one longitudinal and transverse groove combination, wherein the tension casing is a hollow cylinder having a cover plate, wherein the fixing elements are arranged in a lower region of the inner wall of the hollow cylinder; further comprising a movable bayonet ring, wherein the fixing elements in combination with protrusions arranged in a region of the movable bayonet ring provide a bayonet lock.

2. The vertical position fixing assembly for a treatment chamber according to claim 1, wherein the fixing elements facilitate a vertical position fixing of the treatment chamber elements relative to each other.

3. The vertical position fixing assembly for a treatment chamber according to claim 1, wherein the longitudinal and transverse groove combination has at least two transverse grooves that lie above one another in an axial direction so as to facilitate fixing of the closed position in at least two defined vertical distances by engagement between the tension casing and one of the treatment chamber elements.

4. The vertical position fixing assembly for a treatment chamber according to claim 1, wherein the fixing elements include a plurality of longitudinal and transverse groove combinations.

5. The vertical position fixing assembly for a treatment chamber according to claim 4, wherein the plurality of groove combinations are arranged symmetrically or asymmetrically on a circumference of said inner wall of the tension casing.

6. The vertical position fixing assembly c for a treatment chamber according to claim 1, wherein the bayonet ring has an end-face abutment shoulder, wherein the bayonet ring is movably fastened on a bottom plate of the treatment chamber via the end-face abutment shoulder.

7. The vertical position fixing assembly for a treatment chamber according to claim 6, wherein the bayonet ring is movably-fastened with a rotational degree of freedom so that the bayonet ring is pivotable between a locking position and a position in which the fixing elements facilitate axial-linear movability of the treatment chamber elements.

8. The vertical position fixing assembly for a treatment chamber according to claim 7, wherein the rotational degree of freedom corresponds to a a radian measure of approximately ⅛Pi.

9. The vertical position fixing assembly for a treatment chamber according to claim 8, wherein the fixing elements are designed so that tension casing forces are absorbed in the locking position.

10. The vertical position fixing assembly for a treatment chamber according to claim 1, wherein the fixing elements facilitate a vertical position fixing of the treatment chamber elements relative to a bottom plate of the treatment chamber.

11. A tension casing for a treatment chamber of a tire vulcanizing machine, comprising a vertical position fixing assembly for a treatment chamber according to claim 1.

12. A treatment chamber for a tire vulcanizing machine, comprising a tension casing according to claim 11.

13. A tire vulcanizing machine, comprising a treatment chamber according to claim 12.

* * * * *